Jan. 4, 1927.
W. BIRD
CHECK VALVE
Filed Dec. 2, 1925
1,613,076
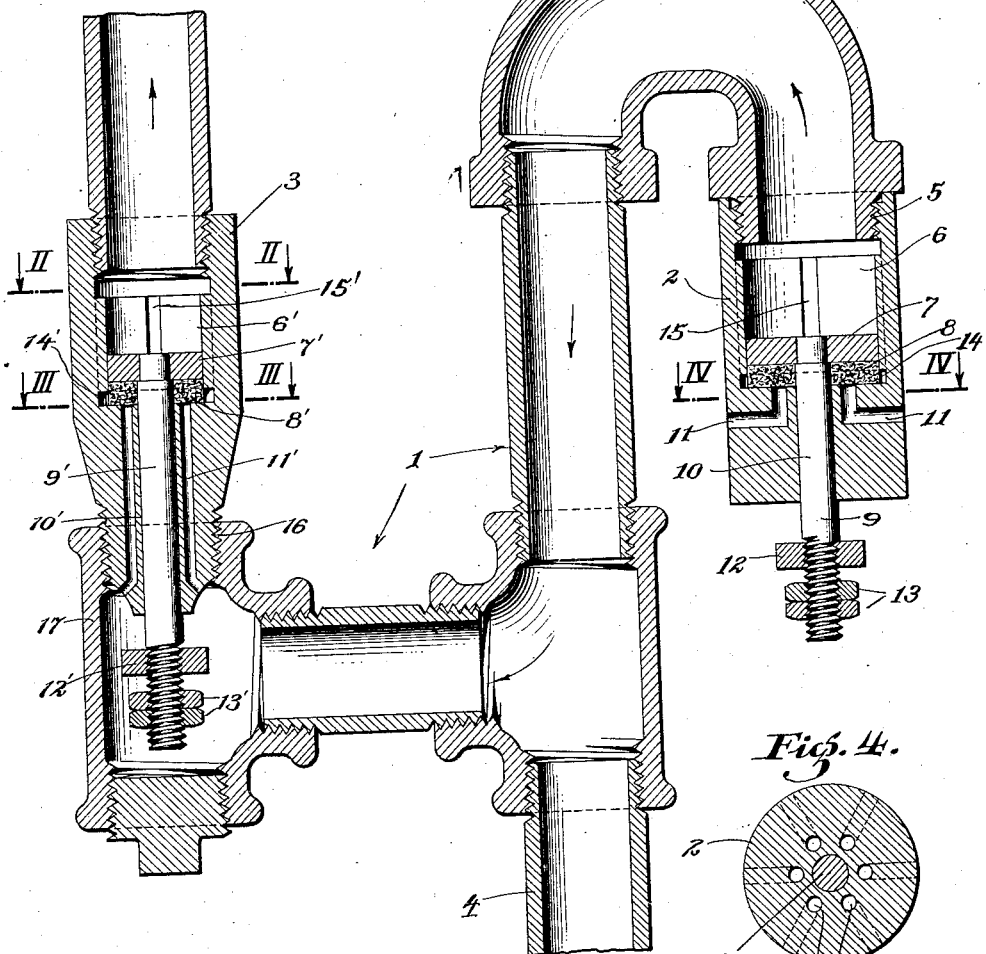
Fig.1.
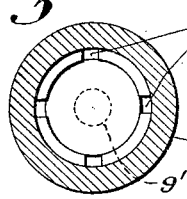
Fig.2.
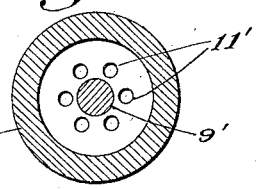
Fig.3.
Fig.4.
INVENTOR.
William Bird
BY
Dewey, Strong, Townsend & Loftus
ATTORNEYS.

Patented Jan. 4, 1927.

1,613,076

UNITED STATES PATENT OFFICE.

WILLIAM BIRD, OF BELMONT, CALIFORNIA.

CHECK VALVE.

Application filed December 2, 1925. Serial No. 72,638.

This invention relates to check valves for use with air compressors or in connection with other fluids. The primary object of the invention is to provide an improved check valve which is simple in construction, will operate quickly without loss of pressure, and which will function efficiently for long periods of time without wearing out.

In the accompanying drawing I have illustrated one specific embodiment of my invention, but it will be understood that the invention can be otherwise embodied and that the drawing is not to be construed as defining or limiting the scope of the invention, the claims appended to this specification being relied upon for that purpose.

Referring to the figures of the drawing:

Figure 1 is a sectional view through a system of air compressor pipes showing two uses of my improved valve.

Figures 2, 3 and 4 are cross sectional views taken on lines II—II, III—III and IV—IV of Fig. 1.

In the drawing, 1 indicates a system of piping connecting an inlet valve 2 with an outlet valve 3, both such valves being constructed in accordance with my invention. The pipe 4 is connected to a pump which alternately creates a vacuum and pressure within the pipe between the two valves. The construction of the two valves is substantially the same and therefore the like parts of one valve will be indicated by the reference characters of the corresponding parts of the other valve primed.

The valve body 2 which is screw-threaded to the pipe 1 at 5 is provided with a chamber 6 therein. A valve member 7 and a cooperating leather washer 8 are mounted on a valve stem 9 and operate in the chamber 6. The valve stem extends through a central hole 10. The bottom of the chamber surrounding the hole 10 provides a valve seat on which the washer 8 normally rests by gravity.

A plurality of ports 11 provides inlet openings into the chamber 6. These openings enter the chamber at the valve seat in a manner adapting the same to be covered by the washer 8 when the same rests on the seat. Upward movement of the valve and stem is limited by a nut 12 and a desired amount of weights can be provided on the stem as the nuts 13 illustrated. Communication between the ports 11 and the chamber 6 is provided by an annular recess 14 and a plurality of vertically extending grooves 15.

The outlet valve 3 differs from the inlet valve 2 in having its lower end screwthreaded at 16 to be received within the T 17 of pipe 1 and in having the ports 11' extending downwardly therethrough into the T.

As above stated, the pipe 4 is adapted to be connected to a pump which alternately creates a vacuum and a pressure within the pipe between the two valves. When a vacuum is created the valve 2 is opened and air is drawn in through the ports 11. When reversal of the pump causes a pressure in the pipes, the valve 2 closes and the valve 3 is opened by the upward pressure of air through the ports 11'. It will be noted that the valve members 7 and 7' are normally closed by gravity and when closed the washer 8 entirely covers the ends of the ports 11 and 11'. Thus the valve is quick acting and no leakage can occur. Also, there is little wear on the parts and the valves are therefore adapted to operate for long periods of time without any loss in efficiency.

Having thus described my invention, what I claim is:

1. A check valve comprising a body portion having a cylindrical chamber therein open at one end and having a valve stem opening extending outwardly therefrom through the other end, the bottom of the chamber providing a valve seat around the said opening, a cylindrical valve member having a sliding fit within the chamber and resting on the seat, a valve stem connected to the member and extending through the said valve stem opening, a plurality of inlet openings being provided through chamber beneath the valve member and covered by the member on its seat, and means including a plurality of grooves formed longitudinally in the cylindrical wall of the chamber providing communication between the inlet openings and the chamber when the valve member is off its seat, the valve member being guided by both the chamber walls and valve stem.

2. A check valve comprising a body portion having a cylindrical chamber therein open at one end and having a valve stem opening extending outwardly therefrom through the other end, the bottom of the chamber providing a valve seat around the said opening, a cylindrical valve member having a sliding fit within the chamber and resting on the seat, a valve stem connected to the member and extending through the said valve stem opening, a plurality of inlet openings being provided through the valve seat beneath the valve member and covered by the member on its seat, and means including a plurality of grooves formed longitudinally in the cylindrical wall of the chamber and opening into an annular groove formed in the said wall around the said seat providing communication between the inlet openings and the chamber when the valve member is off its seat, the valve member being guided by both the chamber walls and valve stem.

WILLIAM BIRD.